United States Patent

[11] 3,617,633

[72] Inventors John Denzil Barr
Oadby;
Dexter Robert Plummer, Englehurst, both of England

[21] Appl. No. 779,899
[22] Filed Nov. 29, 1968
[45] Patented Nov. 2, 1971
[73] Assignee The Rank Organisation Limited
London S.W.1, England
[32] Priority Dec. 14, 1967
[33] Great Britain
[31] 56897/67

[54] IMPROVEMENTS IN OR RELATING TO TELEVISION CAMERA AUTOMATIC FOCUS CONTROL SYSTEM
19 Claims, 2 Drawing Figs.

[52] U.S. Cl. 178/7.2
[51] Int. Cl. H04n 5/16
[50] Field of Search 178/7.2 E, 7.92; 350/131, 144, 187, 44; 250/204

[56] References Cited

UNITED STATES PATENTS

| | | | |
|---|---|---|---|
| 2,258,903 | 10/1941 | Mitchell | 350/144 |
| 2,964,590 | 12/1960 | Gillette | 178/7.2 |
| 3,450,833 | 6/1969 | Hobrough | 178/7.2 |
| 3,450,883 | 6/1969 | Thomas | 250/204 |

*Primary Examiner*—Robert L. Griffin
*Assistant Examiner*—John C. Martin
*Attorney*—Holcombe, Wetherill & Brisebois

ABSTRACT: A system for automatically maintaining the focus of a television camera in which the camera focus setting is modulated, preferably at half the frame or line scan frequency, and the camera video output passed through a high pass filter to a phase-sensitive detector. The output of the detector is indicative of the magnitude and sense of the departure of the camera focus setting from sharp focus, and is used to control a focus servo.

IMPROVEMENTS IN OR RELATING TO TELEVISION CAMERA AUTOMATIC FOCUS CONTROL SYSTEM

Figure 1:
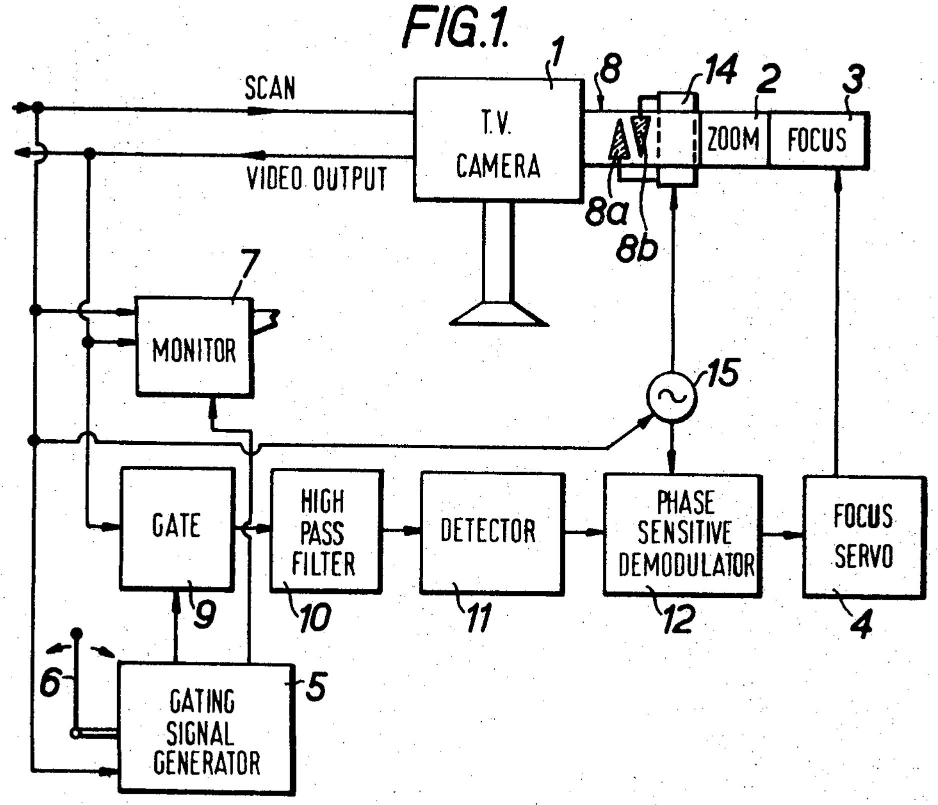

This invention relates to automatic focusing systems for television cameras.

According to the present invention an automatic focusing system for a television camera comprises a focus modulator for cyclically modulating the focus setting of the camera, a high-pass filter for filtering the video output signal of the camera, phase-sensitive detector means synchronized to the focus modulation frequency and responsive to the filter output to provide a focus error signal indicative of the sense and magnitude of the departure of the focus setting from a sharp focus setting, and servo means effective to adjust the camera focus setting in response to said focus error signal and in a sense to reduce the magnitude of said error signal.

Preferably the phase-sensitive detector means comprise a detector responsive to the output component of the filter at the modulation frequency, and a phase-sensitive demodulator synchronized to the modulation frequency.

The focus modulator may be arranged to modulate the camera focus setting at a frequency which preferably but not necessarily is half the line or frame scan frequency, and preferably with a substantially square waveform.

Preferably the focus modulator comprises at least one optical element movable within the optical path of the camera to cause cyclic fluctuation of the camera focus setting, while the picture size and position as viewed in the camera remain substantially constant.

The or each said optical element may be movable cyclically along, or cyclically across, the optical path of the cameras. In the latter alternative, the focus modulator may comprise a pair oflight-transmitting elements of varying optical thickness arranged for oscillation in phase opposition substantially perpendicular to the optical axis of the camera to cause cyclic variation of the total effective thickness of the said elements in the optical path of the camera.

The light-transmitting elements in a preferred embodiment of the invention are of uniformly varying thickness and are arranged with their thicknesses varying in opposite directions, perpendicular to the optical axis of the camera. Said light-transmitting elements may be of substantially identical wedge-shaped form arranged transversely to the optical axis of the camera with their apices on opposite sides of said axis. Alternatively, the light-transmitting elements may comprise respectively a wedge-shaped element arranged transversely to the optical axis of the camera and a light-transmitting block having a wedge-shaped recess into which the wedge-shaped element at least partially fits.

Preferably the video output signal of the camera is applied to high-pass filter through gating means which select a predetermined part of the video signal to be used to control the focus of the camera. Selector means may be provided for controlling the gating means and effective to select the part of the video signal, corresponding to a selected zone of the field of view of the camera, which is passed by the gating means to the filter.

The gating means preferably include a gating signal generator synchronized with respect to the scanning waveforms of the camera and effective to produce gating signals at predetermined parts of the frame and/or line scan of the camera, as determined by the selector means.

Thus the part of the video signal to be used for focus control can be selected by an operator and the width and height of the zone defined by the selected part independently varied by the operator. The selector means may display the coordinates of the center of the zone defined by the selected part of the video signal.

The system may also include a monitor effective to indicate, in combination, the gating signal and the selected part of the video signal, so as to indicate the position of the selected zone of the picture viewed by the camera to which focus control is applied.

The modulator may be coupled to the iris and/or the focal length setting of the camera so that the depth of focus modulation remains substantially constant irrespective of the iris and/or focal length setting of the camera.

Figure 2:
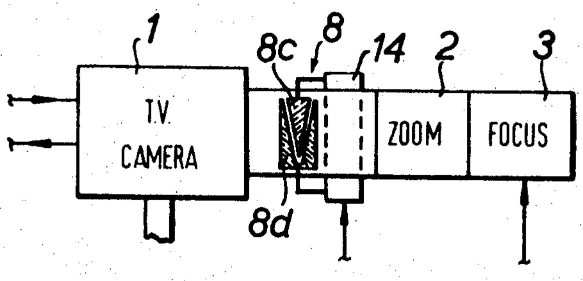

One embodiment of the apparatus according to the present invention will now be particularly described hereinafter by way of example with reference to the accompanying drawings, in which FIG. 1 is a block diagram of a system for automatically focusing a television camera, and FIG. 2 illustrates diagrammatically an alternative form of modulator which may be employed in the system of FIG. 1.

FIG. 1 shows an automatic focusing system which can be used as an accessory to a standard television camera having a servo-controlled lens.

The system comprises a television camera 1 having a zoom lens 2 and a focusing mechanism 3 which is controlled by a focus servo 4.

The system includes means for controlling the focus servo 4 to give optimum focus, that is, sharp definition, on a chosen part of a picture and such means include a gating signal generator 5 which determines on which portion of the picture optimum focusing is to be obtained. The gating signal generator 5 provides a gating signal when the scanning spot of the camera is in the selected portion of the picture. The portion is selected by controls which include two potentiometers (not shown) coupled to a universally movable control lever 6 to determine the coordinates of the center of a small rectangular zone which contains the selected portion of the picture. The width and height of this zone may also be controlled independently.

The gating signal generator 5 also passes a signal to a monitor 7 where this signal is combined with the picture signal to indicate which portion of the picture has been selected for focusing. This signal is preferably different from the gating signal and preferably illuminates the edge of the selected zone. The portion of the picture selected for focusing is thus indicated visually. The gating signal generator 5 operates by comparing the amplitudes of the frame and line scan waveforms with voltage levels set by the operator controls and operating and/or type logic circuit.

The signal from the gating signal generator 5 to the monitor 7 could be either added to or subtracted from the picture signal.

The system also includes modulating means 8 for modulating the focus setting of the camera 1 at a frequency which is half the frame scan frequency and with an approximately square waveform. The modulating means 8 are arranged within the optical path of the camera 1 between the zoom lens 2 and the camera 1 to produce a focus modulation depth which is independent of zoom.

The modulator means comprise one or more moving or oscillatory optical elements which are arranged in the optical path of the camera 1 in such a way that the focus setting fluctuates cyclically, but the picture size and position remain constant. The optical element in the embodiment of FIG. 1 comprise a pair of transparent wedges **8*a*, 8*b* which are vibrated perpendicularly to the optical axis of the camera but arranged so that their effects on the picture size and position cancel. Thus the wedges 8*a*, 8*b* are identical and arranged with their axes of symmetry transverse to the optical axis of the camera but with their verticles on opposite sides of the optical axis. The wedges 8*a*, 8*b* are vibrated in phase opposition, that is, 180° out of phase with each other, preferably with oscillations having a square waveform. For this purpose, the wedges 8*a*, 8*b* are connected to a vibratory drive unit 14 which generates vibrations having the required square waveform and a frequency equal to half the frame or line scan frequency. The vibratory drive unit 14 is synchronized with respect to the respective scan repetition frequency by means of a synchronizing waveform generator 15** which is responsive to the frame or line scan synchronization signals controlling the camera scanning.

Alternatively, as shown in FIG. 2, the focus modulator 8 may comprise, instead of the wedges 8*a*, 8*b*, male and female transparent elements 8*c*, 8*d* of uniformly varying thickness as measured parallel to the optical axis, the thickness variation of the elements 8*c*, 8*d* being equal but in opposite directions. The male element 8*c* is wedge-shaped while the female element 8*d* comprises a light-transmitting block with a wedge-shaped recess therein into which the element 8*c* at lease partially fits.

The focus modulators 8 shown in FIGS. 1 and 2 are such that, upon operation of the drive unit 14, the effective length of the optical path through the optical system of the camera 1 varies cyclically (preferably with a square wave characteristic) changing the focusing of the camera correspondingly, without altering the size, shape or position of the image provided by the camera.

The apex angles selected for the wedge-shaped elements 8*a*, 8*b* and 8*c* will be dependent on the amount of loss of light by reflection in these elements that can be tolerated, the amplitude of the mechanical vibrations, and the required depth of focus modulation.

The vibratory drive unit 14, which is shown diagrammatically, would in practice be mounted flexibly on the lens housing of the camera 1 to minimize the transmission of vibrations to the latter. Masses may be added to the vibrating components as required to produce a dynamically balanced vibratory system.

It will be appreciated that other forms of focus modulator 8 may be employed. For example, the modulator may include at least one optical element movable cyclically along the optical path of the camera. Thus a further alternative form of focus modulator (not shown) comprises one or more convergent and/or divergent optical elements which may be vibrated parallel to the optical axis, also arranged so that their effects on the picture size and position cancel. These optical elements may be part of the zoom lens 2.

THe depth of the focus modulation is sufficient to cause a significant variation in the video signal from the camera but is insufficient to cause an unacceptable effect of the transmitted signal as this has a smaller band width. The amplitude of the focus modulation may be also coupled to the iris mechanism of the camera to reduce the chances of unwanted effects being produced on the transmitted signal.

To explain the effect of the focus modulator 8 it should be assumed that the lens focusing mechanism 3 is adjusted so that it is focused at a plane which is too far from the camera: that is, objects in this plane are in sharp focus, whereas it is desired that objects in a plan closer to the camera should be in sharp focus. If the focus modulator 8 operates at half the frame scan frequency, alternate frames are in worse and better focus.

When the system is in operation that part of the video signal corresponding to the chosen part of the picture is gated out by a gate 9 under the control of the gating signal from the generator 5 and is fed into a high-pass information filter 10. The AC output of the filter 10 varies with the sharpness of the focus of the camera, and the output of the filter 10 is therefore modulated at the frequency of vibration of the focus modulator 8.

The reason for this variation in the filter output is as follows; The effect of defocusing the image is to reduce the higher frequency components in the corresponding video signal. In the system being described the output of the high pass filter 10 will accordingly be greater when the camera is in focus, as the signal will have a larger high-frequency content when the camera 1 is in focus, than when the camera is out of focus. (In the extreme condition of the camera being completely out of focus, the video signal will contain only a zero frequency component and the synchronizing signal).

The output of the high-pass filter 10 will consist of the high-frequency components of the input video signal, which will in general have different amplitudes in alternate frames; in effect, therefore, the output of the filter 10 will be modulated at half the frame scan frequency. When this output is detected in a detector 11 it therefore provides a signal which contains a component at half the frame scan frequency, which in the present case is the focus modulation frequency. The phase of this component is determined by the direction of the focus error on the chosen part of the picture.

In order to explain how the phase of this component is determined by the direction of the focus error it is assumed that the focus modulating means 8 causes the focusing section 3 to bring to a sharp focus objects in a plane nearer the camera 1 on odd frames and farther from the camera 1 on even frames. It was assumed that in this example the focusing mechanism 3 is focused at a plane which is too far from the camera 1. Therefore odd frames will be in worse focus and even frames in better focus. The high-frequency output of the filter 10 will consequently be less during odd frames than during even frames. The output of the detector 11 will therefore fall for odd frames and rise for even frames.

Similarly, if the focusing section 3 had been focused at a plane which was too near the camera 1, then the output of the detector 11 would have risen for odd frames and fallen for even frames.

THe output from the detector 11 is fed into a phase-sensitive demodulator 12 synchronized by a frequency signal from the generator 15 equivalent to that used to modulate the focus. The output signal from the phase-sensitive demodulator 12 represents in magnitude and sign the magnitude and sense of the focus error and is used to control the focus servo 4 so as to reduce the magnitude of the servo error. An equilibrium condition is reached when the focus modulation is such that the camera is sharply focused at the center of the range of modulation: the output of the detector 11 will then be zero at the modulation frequency, and hence the error signal will be zero.

The type of servo control used will depend on the lens system of the camera 1. If the camera has a fixed focus objective either the whole objective or some of its elements could be moved. However, in the arrangement described the focus mechanism 3 is located in front of the zoom lens 2 and is moved independently of the zoom lens 2 by the focus servo 4.

The effective loop gain of the focus servo 4 will vary according to circumstances. Variation in loop gain due to zoom can be partially compensated by attenuating the focus error signal by a potentiometer (not shown) coupled to the zoom mechanism. The loop gain will also vary with the amount of picture detail in the chosen part of the picture and this variation might be reduced by a suitable automatic gain control. The high-pass filter 10 must be designed to maintain sensitivity even when the image is a long way out of focus. The focus modulation frequency, although synchronized in the above-described example to half the frame scan frequency, may be any other frequency over a wide range not necessarily synchronized to scan.

Both the video and the scan synchronization signals used in the system herein described may be derived from an unprocessed television video signal using separating techniques well known in the art.

We claim:

1. In a television camera, an automatic focusing system comprising:
   - a focus modulator effective to cyclically modulate the focus setting of the camera with a substantially square waveform at a focus modulation frequency which is synchronous with the frame scan frequency of the camera,
   - a high-pass filter connected to the video output of the camera adapted to pass high-frequency components of said video output,
   - a detector responsive to the output component of the high-pass filter at the modulation frequency,
   - phase-sensitive demodulator means,
   - means synchronizing the phase-sensitive demodulator means to the focus modulation frequency, said phase-sensitive demodulator means providing a focus error signal indicative of the sense and magnitude of the departure of the focus setting and from a sharp focus setting, servo means effective to adjust the camera focus setting in response to said focus error signal and in a sense to reduce the magnitude of said error signal.

2. System as claimed in claim 1 including means adjusting the focal length setting of the camera, whereby the depth of focus modulation remains substantially constant irrespective of the focal length setting of the camera.

3. System as claimed in claim 1 including gating means through which the video output of the camera is applied to the high-pass filter, said gating means selecting a predetermined part of the video output to be used to control the focus of the camera.

4. System as claimed in claim 3, including a monitor effective to indicate, in combination, the gating signal and the selected part of the camera video output, thereby indicating the position of the selected zone of the picture viewed by the camera to which focus control is applied.

5. System as claimed in claim 3, including selector means controlling the gating means and effective to select the predetermined part of the video output, corresponding to a selected zone of the field of view of the camera, which is passed by the gating means to the filter.

6. System as claimed in claim 5, wherein the gating means include a gating signal generator synchronized with respect to the scanning waveforms of the camera and effective to produce 7. System as claimed in claim 1, in which the focus modulator comprises at least one optical element movable within the optical path of the camera to cause cyclic fluctuation of the camera focus setting, while the picture size and position as viewed in the camera remain substantially constant.

8. System as claimed in claim 7, in which the focus modulator comprises a pair of light-transmitting elements of varying optical thickness, and means effecting oscillation of said elements in phase opposition substantially perpendicular to the optical axis of the camera to cause cyclic variation of the total effective thickness of the said elements in the optical path of the camera.

9. System as claimed in claim 8, in which the light-transmitting elements are of uniformly varying thickness and are arranged with their thicknesses varying in opposite directions, perpendicular to the optical axis of the camera.

10. System as claimed in claim 9, in which the light-transmitting elements are substantially identical wedge-shaped elements arranged transversely to the optical axis of the cameras with their apices on opposite sides of said axis.

11. System as claimed in claim 9, in which the light-transmitting elements comprise respectively a wedge-shaped element arranged transversely to the optical axis of the camera and a light-transmitting block having means defining a wedge-shaped recess into which the wedge-shaped element at least partially fits.

12. In a television camera, an automatic focusing system comprising:

a focus modulator effective to cyclically modulate the focus setting of the camera with a substantially square waveform at a focus modulation frequency which is half the line scan frequency of the camera, a high-pass filter connected to the video output of the camera and adapted to pass high frequency components of said video output, a detector responsive to the output component of the high-pass filter at the modulation frequency, phase-sensitive demodulator means, means synchronizing the phase-sensitive demodulator means to the focus modulation frequency, said phase-sensitive demodulator means providing a focus error signal indicative of the sense and magnitude of the departure of the focus setting from a sharp focus setting, servo means effective to adjust the camera focus setting in response to said focus error signal and in a sense to reduce the magnitude of said error signal, 13. System as claimed in claim 12 in which the focus modulator comprises at least one optical element movable within the optical path of the camera to cause cyclic fluctuation of the camera focus setting, while the picture size and position as viewed in the camera remain substantially constant.

14. System as claimed in claim 12 including gating means through which the video output of the camera is applied to the high-pass filter, said gating means selecting a predetermined part of the video output to be used to control the focus of the camera.

15. System as claimed in claim 14, including selector means controlling the gating means and effective to select the predetermined part of the video output, corresponding to a selected zone of the field of view of the camera, which is passed by the gating means to the filter.

16. System as claimed in claim 15, wherein the gating means include a gating signal generator synchronized with respect to the scanning waveforms of the camera and effective to produce gating signals at predetermined parts of the line scan of the camera, as determined by the selector means.

17. System as claimed in claim 14, including a monitor effective to indicate, in combination, the gating signal and the selected part of the camera video output, thereby indicating the position of the selected zone of the picture viewed by the camera to which focus control is applied.

18. System as claimed in claim 12, including means adjusting the focal length setting of the camera, whereby the depth of focus modulation remains substantially constant irrespective of the focal length setting of the camera.

19. In a television camera, an automatic focusing system comprising:

a focus modulating effective to cyclically modulate the focus setting of the camera with a substantially square waveform at a focus modulation frequency which is half the frame scan frequency of the camera, a high-pass filter connected to the video output of the camera and adapted to pass high-frequency components of said video output, a detector responsive to the output component of the high-pass filter at the modulation frequency, phase-sensitive demodulator means, means synchronizing the phase-sensitive demodulator means to the focus modulation frequency, said phase-sensitive demodulator means providing a focus error signal indicative of the sense and magnitude of the departure of the focus setting from a sharp focus setting, servo means effective to adjust the camera focus setting in response to said focus error signal and in a sense to reduce the magnitude of said error signal.

* * * * *

UNITED STATES PATENT OFFICE
CERTIFICATE OF CORRECTION

Patent No. 3,617,633 Dated November 2, 1971

Inventor(s) JOHN DENZIL BARR and DEXTER ROBERT PLUMMER

It is certified that error appears in the above-identified patent and that said Letters Patent are hereby corrected as shown below:

Claim 1, column 4, line 75, cancel "and" before "from" and insert --and-- after the comma.

Claim 6, column 5, line 26, insert --gating signals at predetermined parts of the frame scan of the camera, as determined by the selector means.--

Claim 19, column 6, line 43, cancel "modulating and substitute --modulator--.

Signed and sealed this 3rd day of October 1972.

(SEAL)
Attest:

EDWARD M.FLETCHER,JR.
Attesting Officer

ROBERT GOTTSCHALK
Commissioner of Patents